(12) United States Patent  (10) Patent No.: US 8,201,846 B2
Yu et al.  (45) Date of Patent: Jun. 19, 2012

(54) BACKREST RECLINE ADJUSTMENT DEVICE FOR A STROLLER

(75) Inventors: Fu-Sian Yu, Taipei (TW); Hong-Bo Chen, Taipei (TW); Chih-Wei Wang, Taipei (TW)

(73) Assignee: Excellerate Enterprise Co., Ltd., Taipei (TW)

( * ) Notice: Subject to any disclaimer, the term of this patent is extended or adjusted under 35 U.S.C. 154(b) by 350 days.

(21) Appl. No.: 12/613,972

(22) Filed: Nov. 6, 2009

(65) Prior Publication Data

US 2010/0117315 A1    May 13, 2010

(30) Foreign Application Priority Data

Nov. 7, 2008  (CN) .......................... 2008 1 0175554

(51) Int. Cl.
*B62B 7/00* (2006.01)
(52) U.S. Cl. ..................... 280/650; 280/642; 280/47.38; 280/47.4
(58) Field of Classification Search ................... 280/642, 280/643, 644, 647, 648, 649, 650, 657, 658, 280/47.25, 47.38, 47.39, 47.4, 47.41; 403/94, 403/96, 97
See application file for complete search history.

(56) References Cited

U.S. PATENT DOCUMENTS

| 5,028,061 | A | * | 7/1991 | Hawkes | .................. 280/47.4 |
| 5,039,118 | A | * | 8/1991 | Huang | .................. 280/47.371 |
| 5,520,474 | A | * | 5/1996 | Liu | ................................. 403/97 |
| 5,687,985 | A |   | 11/1997 | Sack |  |

* cited by examiner

*Primary Examiner* — Katy M Ebner
(74) *Attorney, Agent, or Firm* — Pillsbury Winthrop Shaw Pittman, LLP

(57) ABSTRACT

A backrest recline adjustment assembly includes a stationary seat, a rotary seat, and a driving component. The stationary seat is connected to a stroller frame, and is provided with a first positioning unit. The rotary seat is connected to a backrest unit and has a second positioning unit, a groove formed thereon, and a first cam surface formed in the groove. The driving component is disposed in the groove of the rotary seat and provided with a second cam surface. The driving component is movable to drive sliding movement of the second cam surface relative to the first cam surface, thereby moving the rotary seat against biasing action of a resilient component from a securing position, where the rotary seat is positioned relative to the stationary seat, to a releasing position, where the rotary seat is rotatable relative to the stationary seat.

21 Claims, 7 Drawing Sheets

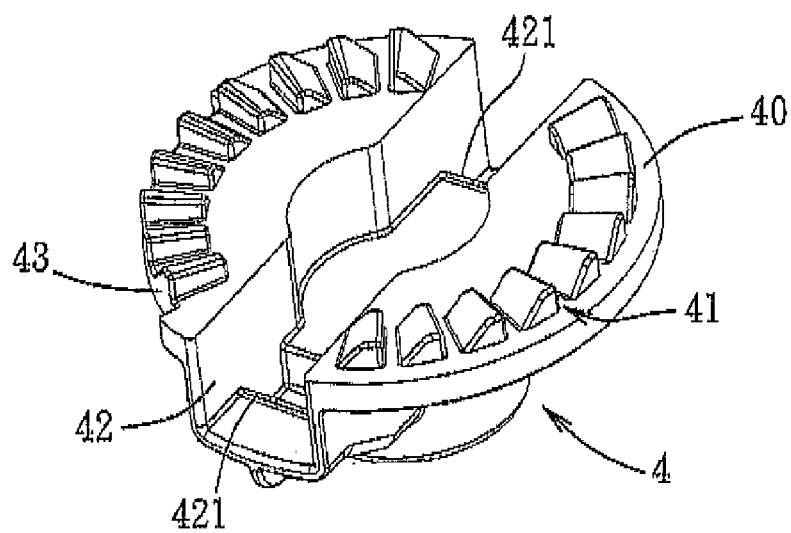
F I G. 7
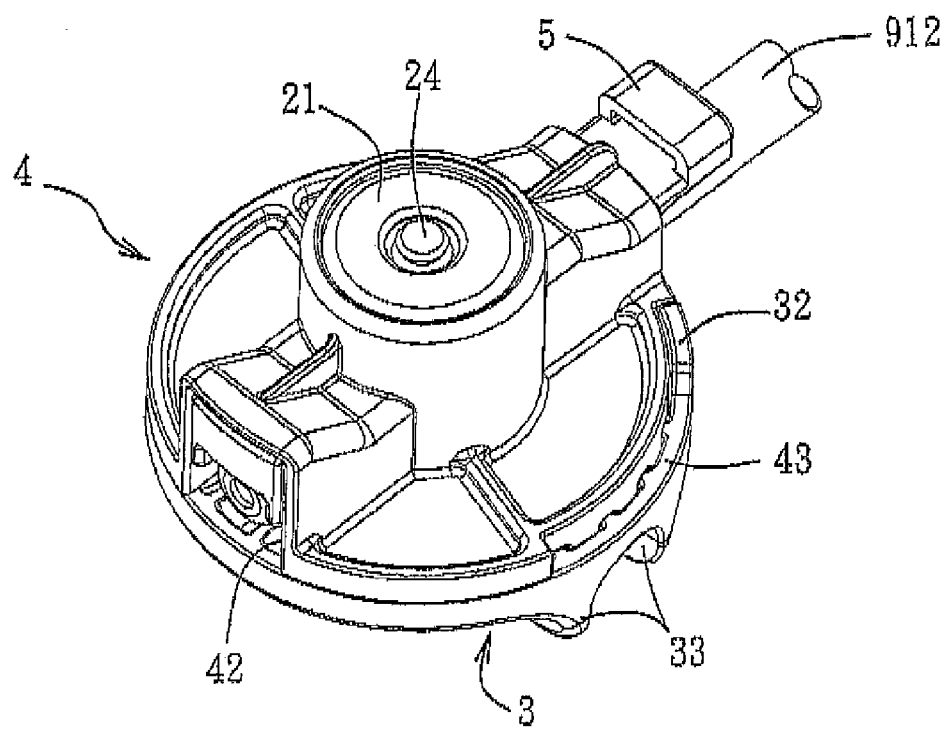
F I G. 8

US 8,201,846 B2

BACKREST RECLINE ADJUSTMENT DEVICE FOR A STROLLER

CROSS-REFERENCE TO RELATED APPLICATION

This application claims priority of Chinese Application No. 200810175554.X, filed on Nov. 7, 2008.

BACKGROUND OF THE INVENTION

1. Field of the Invention

The invention relates to a backrest recline adjustment device, more particularly to a backrest recline adjustment device for a stroller.

2. Description of the Related Art

A stroller generally comprises a stroller frame and a backrest unit. Typically, the backrest unit is tiltably connected to the stroller frame for the sake of comfort of an infant seated on the stroller.

U.S. Pat. No. 5,687,985 discloses a conventional backrest recline adjustment device 1 for a stroller (not shown) as illustrated in FIG. 1. The conventional backrest recline adjustment device 1 includes a first pivot member 11 secured to a frame body (not shown) and formed with four notches 111, and a second pivot member 12 secured to a backrest unit (not shown) and having a pair of abutment teeth 121 that engage releasably a pair of the notches 111 in the first pivot member 11. In use, the second pivot member 12 is moved in a direction away from the first pivot member 11 so that the abutment teeth 121 are disengaged respectively from the notches 111. Afterward, the second pivot member 12 is pivoted to a desired inclination angle relative to the first pivot member 11. Finally, the second pivot member 12 is moved back to engage the first pivot member 11 through engagement between the abutment teeth 121 and another pair of the notches 111, thereby positioning the second pivot member 12 at the desired inclination angle relative to the first pivot member 11.

However, since the conventional backrest recline adjustment device 1 is generally disposed at the bottom of the backrest unit, parents have to bend down to operate the conventional backrest recline adjustment device 1, thereby resulting in inconvenience when they use the stroller. Moreover, the engagement between the abutment teeth 121 and the notches 111 are relatively unstable.

SUMMARY OF THE INVENTION

Therefore, an object of the present invention is to provide a backrest recline adjustment device for a stroller that is stable and easy to operate. A user can operate the backrest recline adjustment device by using only one hand.

Another object of the present invention is to provide a stroller comprising a backrest recline adjustment device that is easy to operate.

Accordingly, a backrest recline adjustment device of the present invention is adapted for connecting rotatably a backrest unit to a stroller frame of a stroller. The backrest recline adjustment device comprises a backrest recline adjustment assembly that includes a stationary seat, a rotary seat, a resilient component, and a driving component. The stationary seat is adapted to be connected fixedly to the stroller frame, and has a connecting surface provided with a first positioning unit. The rotary seat is adapted to be connected fixedly to the backrest unit, and has a coupling surface confronting the connecting surface of the stationary seat, provided with a second positioning unit that corresponds in position to the first positioning unit, and formed with a groove. The rotary seat further has a first cam surface that is formed in the groove. The rotary seat is movable relative to the stationary seat between a releasing position, where the rotary seat is rotatable relative to the stationary seat, and a securing position, where the first positioning unit engages removably the second positioning unit for positioning the rotary seat relative to the stationary seat. The resilient component is disposed for biasing the rotary seat toward the stationary seat. The driving component is disposed slidably in the groove of the rotary seat and is provided with a second cam surface abutting slidably against the first cam surface. The driving component is movable relative to the rotary seat to drive movement of the second cam surface relative to the first cam surface, thereby moving the rotary seat from the securing position to the releasing position against biasing action of the resilient component.

BRIEF DESCRIPTION OF THE DRAWINGS

Other features and advantages of the present invention will become apparent in the following detailed description of the preferred embodiment with reference to the accompanying drawings, of which:

FIG. 7 is a perspective view of a rotary seat of the preferred embodiment; and

FIG. 8 is an assembled perspective view of the backrest recline adjustment assembly of the preferred embodiment.

DETAILED DESCRIPTION OF THE PREFERRED EMBODIMENT

Figure 1:
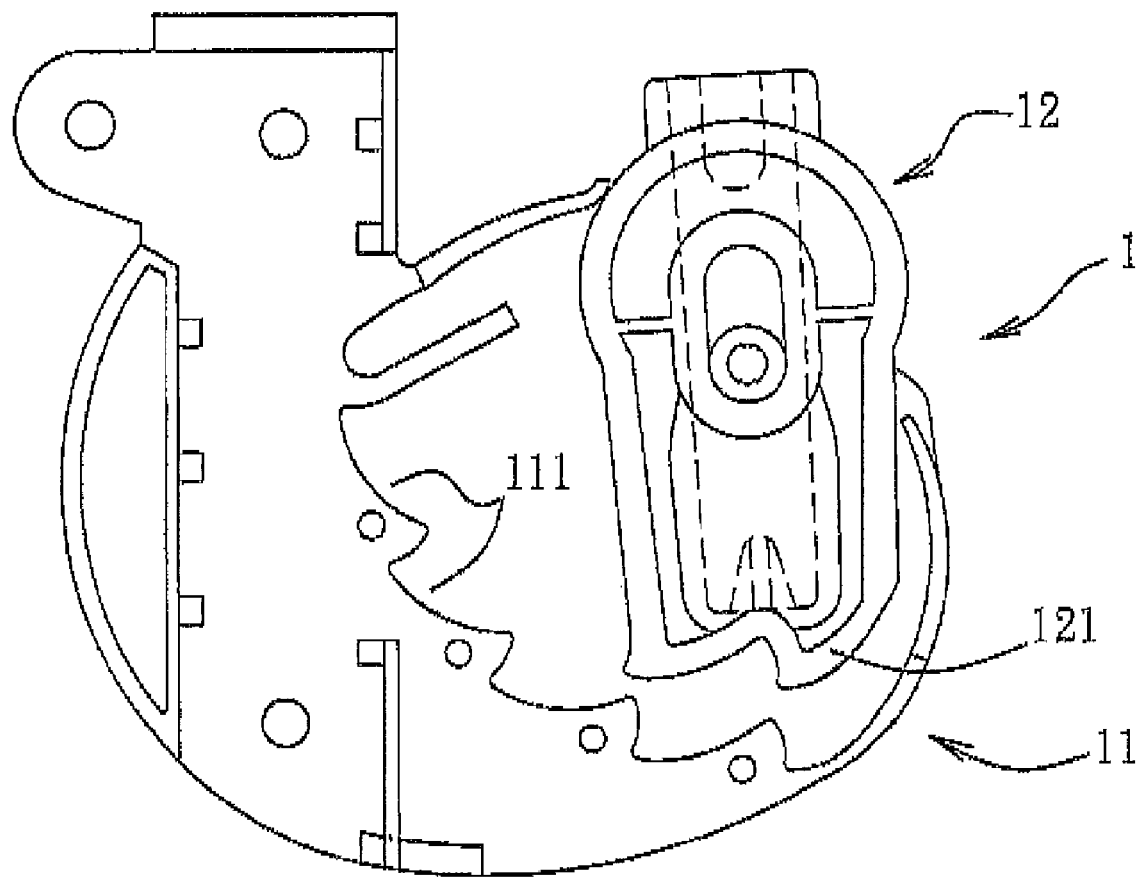
FIG. 1 is a schematic view of a conventional backrest recline adjustment device for a stroller, which is disclosed in U.S. Pat. No. 5,687,985.
Figure 2:
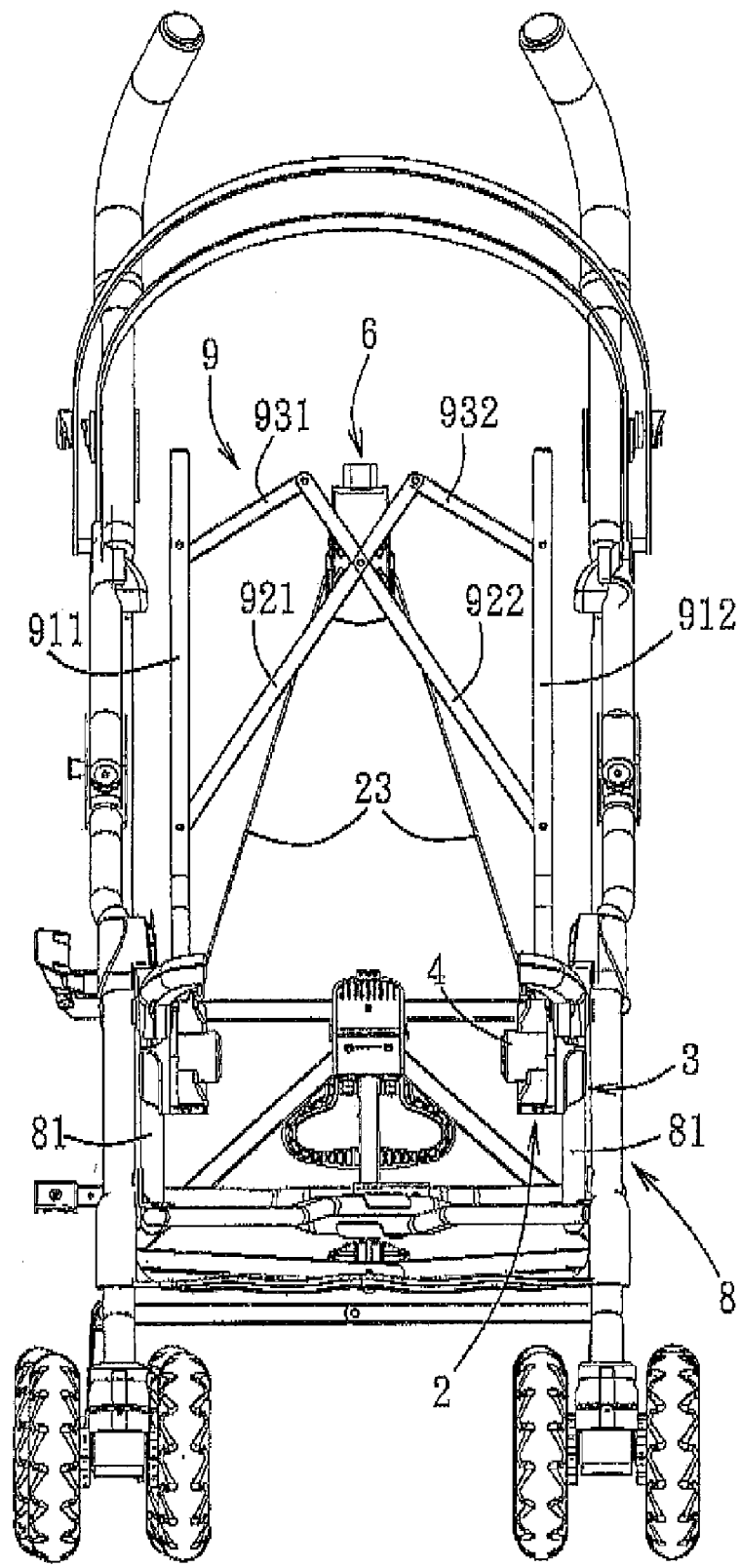
FIG. 2 is a front view of a stroller mounted with a preferred embodiment of a backrest recline adjustment device according to the invention.
Figure 3:
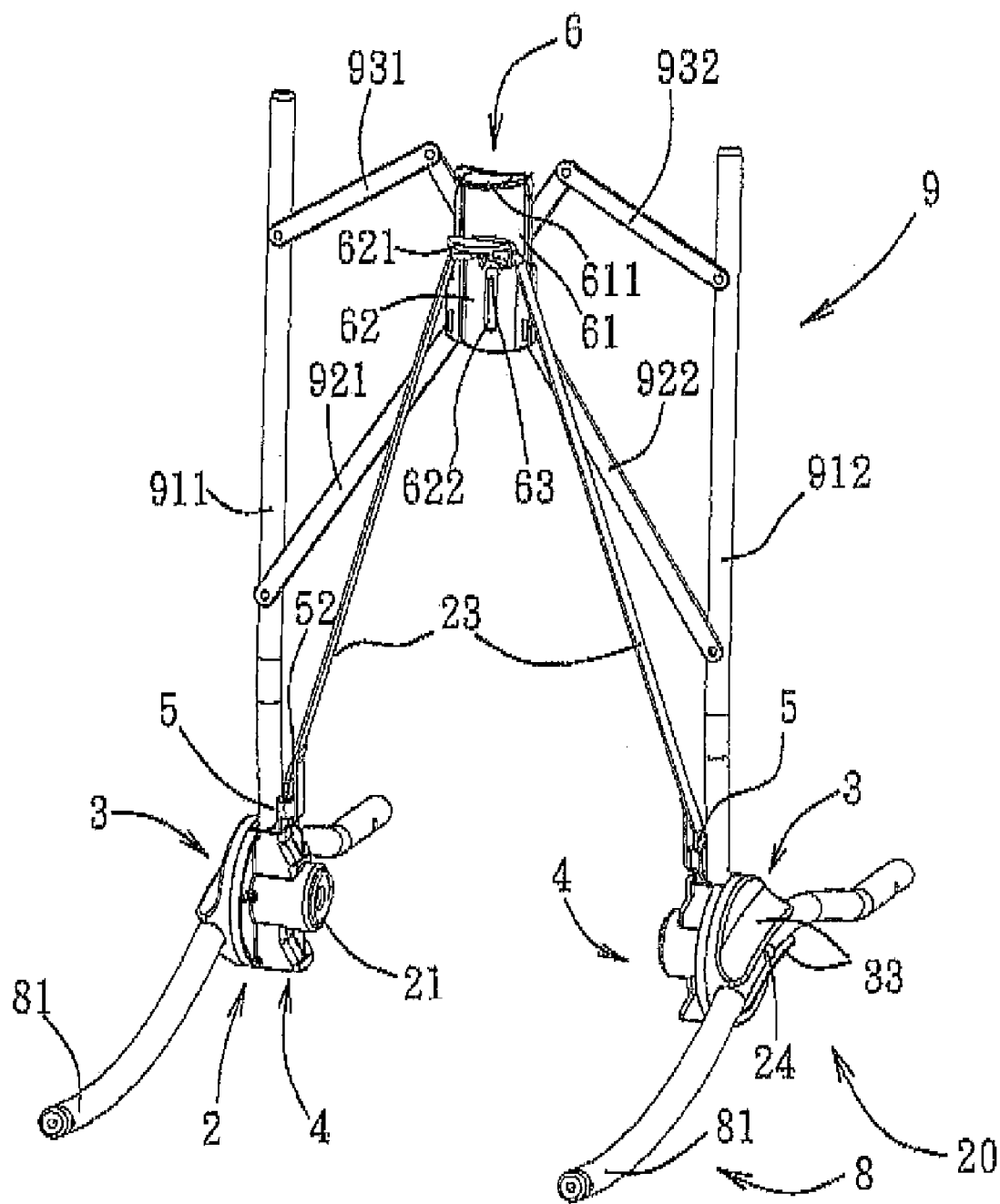
FIG. 3 is an assembled perspective view of the preferred embodiment, a backrest unit and a stroller frame of the stroller.
Figure 4:
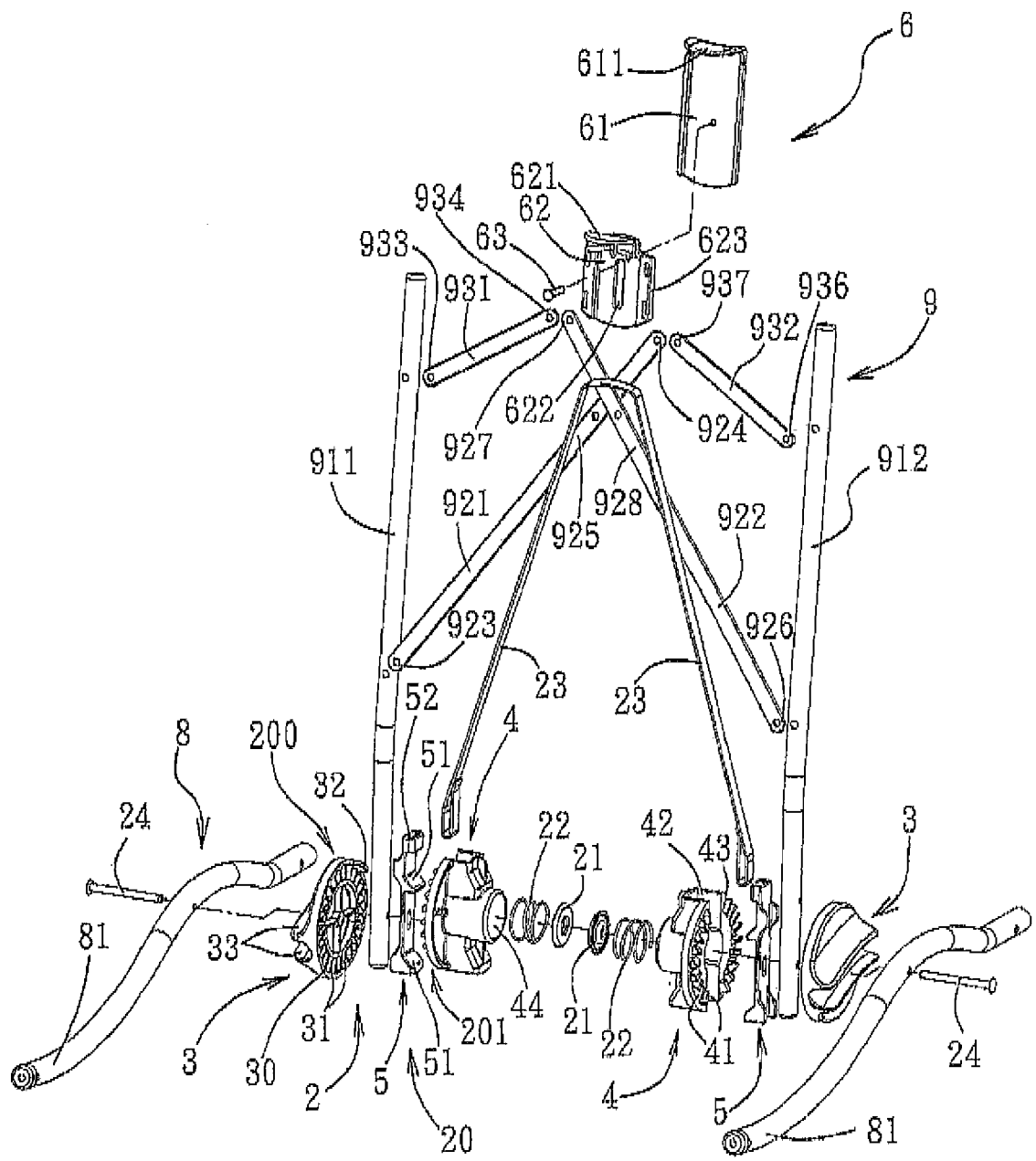
FIG. 4 is an exploded perspective view of the preferred embodiment, the backrest unit and the stroller frame of the stroller.

As shown in FIGS. 2 to 4, the preferred embodiment of a backrest recline adjustment device 20 according to the present invention is adapted for use in a stroller. The stroller comprises a backrest unit 9 and a stroller frame 8. The backrest recline adjustment device 20 is used for connecting rotatably the backrest unit 9 to the stroller frame 8. The stroller frame 8 includes a pair of spaced-apart seat reds 81 disposed at two sides of a seat unit (not shown). The backrest unit 9 includes left and right backrest rods 911, 912, left and right long connecting rods 921, 922, and left and right short connecting rods 931, 932. The left long connecting rod 921 has a connecting rod end 923 that is connected pivotally to the left backrest rod 912, a distal rod end 924 that is disposed opposite to the connecting rod end 923, and an intermediate rod portion 925 that is disposed between the connecting and distal rod ends 923, 924. The right long connecting rod 922 has a connecting rod end 926 that is connected pivotally to the right backrest rod 912, a distal rod end 927 that is disposed opposite to the connecting rod end 926, and an intermediate rod portion 928 that is disposed between the connecting and distal rod ends 926, 927, and that intersects the intermediate rod portion 925 of the left long connecting rod 921. The left short connecting rod 931 has a connecting rod end 933 that is connected pivotally to the left backrest rod 911, and a distal rod end 934 that is disposed opposite to the connecting rod end 933 and that is connected pivotally to the distal rod end 927 of the right long connecting rod 922. The right short connecting rod 932 has a connecting rod end 936 that is connected pivotally to the right backrest rod 912, and a distal rod end 937 that is disposed opposite to the connecting rod end 936 and that is connected pivotally to the distal rod end 924 of the left long connecting rod 921.

The backrest recline adjustment device 20 of this invention includes a pair of backrest recline adjustment assemblies 2, and a control unit 6.

Each of the backrest recline adjustment assemblies 2 includes a stationary seat 3, a rotary seat 4, a positioning mechanism 200, a cam mechanism 201, a seat cover 21, a resilient component 22, and a pivot pin 24. Since the structures of the backrest recline adjustment assemblies 2 are identical, only one backrest recline adjustment assembly 2 will be described in the following for the sake of brevity.

Figure 6:
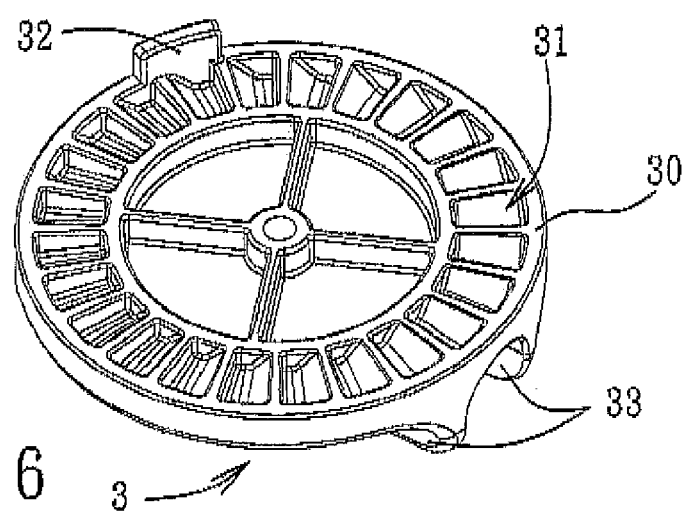
FIG. 6 is a perspective view of a stationary seat of the preferred embodiment.

As shown in FIGS. 4 and 6, the stationary seat 3 has a connecting surface 30, and a pair of spaced-apart clamping walls 33 formed at one side thereof opposite to the connecting surface 30 and retaining cooperatively a respective one of the seat rods 81 of the stroller frame 8 therebetween, such that the stationary seat 3 is connected fixedly to the stroller frame 8.

Figure 5:
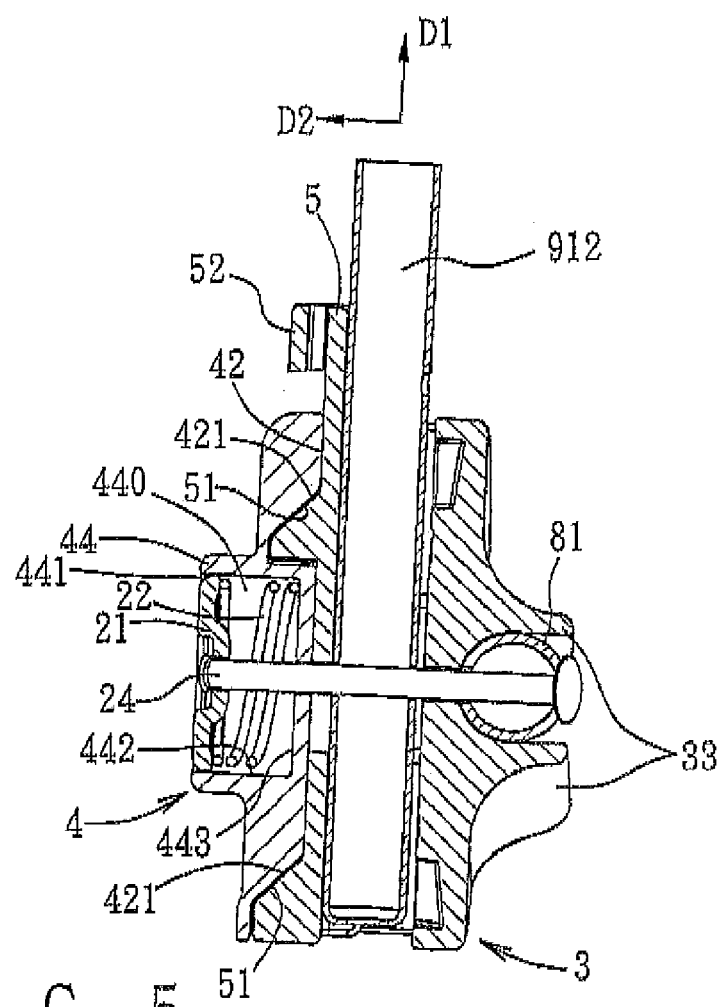
FIG. 5 is a sectional view of a backrest recline adjustment assembly of the preferred embodiment, illustrating a rotary seat at a securing position.

Referring further to FIGS. 5 and 7, the rotary seat 4 is coupled separably to the stationary seat 3, has a coupling surface 40 confronting the connecting surface 30 of the stationary seat 3, and formed with a diametrically extending groove 42 that is adapted to retain a bottom end of a respective one of the left and right backrest rods 911, 912 of the backrest unit 9, such that the rotary seat 4 is connected fixedly to the backrest unit 9. The rotary seat 4 further has a housing 49 formed at one side thereof opposite to the coupling surface 40. The housing 44 has a receiving space 440 that is defined cooperatively by an annular surrounding surface 442 and an end surface 443, and that has an open end 441 opposite to the end surface 443.

The positioning mechanism 200 includes a first positioning unit 31 provided on the connecting surface 30 of the stationary surface 3, and a second positioning unit 41 provided on the coupling surface 40 of the rotary seat 4. In this embodiment, the first positioning unit 31 includes a plurality of angularly spaced-apart recesses, and the second positioning unit 41 includes a plurality of angularly spaced-apart protrusions that correspond in position to the recesses of the first positioning unit 31 for engaging removably and respectively the recesses of the first positioning unit 31 so as to position the rotary seat 4 relative to the stationary seat 3.

Referring to FIGS. 3 to 5, in this embodiment, the cam mechanism 201 includes a pair of inclined first cam surfaces 421 that are formed in the groove 42 of the rotary seat 4. In this embodiment, the cam mechanism 201 further includes a driving component 5 that is disposed slidably in the groove 42 of the rotary seat 4 between the rotary seat 4 and the bottom end of the respective one of the left and right backrest rods 911, 912 of the backrest unit 9, and that has two inclined second cam surfaces 51 abutting slidably and respectively against the first cam surfaces 421, and a connecting portion 52 that is radially exposed from the groove 42.

The pivot pin 24 extends through a respective one of the seat rods 81 of the stroller frame 8, the stationary seat 3, the bottom end of a respective one of the left and right backrest rods 911, 912 of the backrest unit 9, the driving component 5, and the rotary seat 4. The seat cover 21 is disposed in the receiving space 440, and is coupled to the pivot pin 24 such that the seat cover 21 is connected fixedly to the stationary seat 3. The resilient component 22 is disposed in the receiving space 440, and has opposite ends abutting resiliently and respectively against the seat cover 21 and the end surface 443 so as to bias the rotary seat 4 toward the stationary seat 3.

Figure 9:
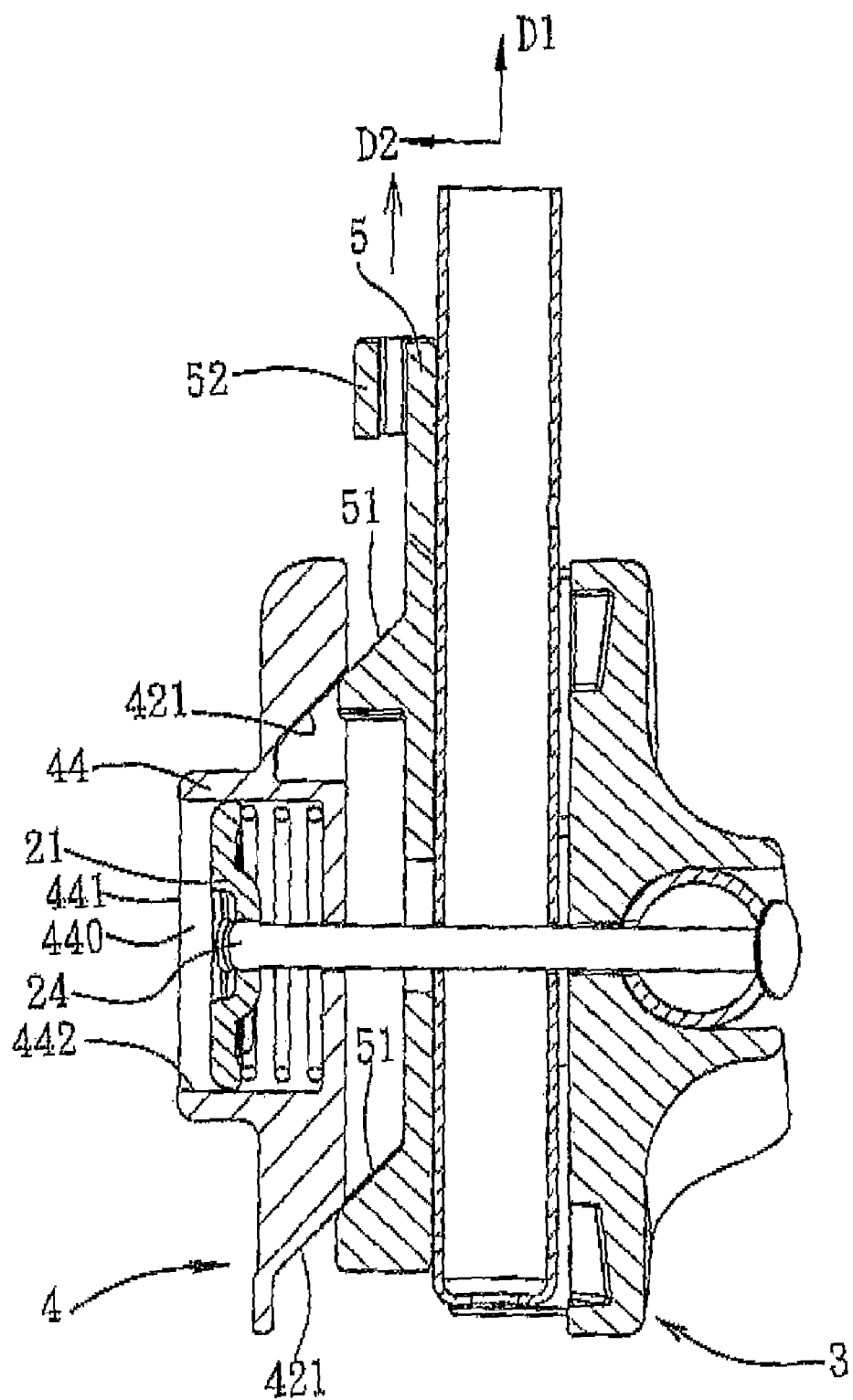
FIG. 9 is a view similar to FIG. 5, but illustrating the rotary seat at a releasing position.

The driving component 5 is movable relative to the rotary seat 4 in a first direction (D1) (see FIG. 5) to drive sliding movement of the first cam surfaces 421 relative to the second cam surfaces 51, thereby driving the rotary seat 4 to move relative to the stationary seat 3 in a second direction (D2) (see FIG. 5) that is transverse to the first direction (D2) against biasing action of the resilient component 22 from a securing position (see FIGS. 5 and 8), where the first positioning unit 31 engages the second positioning unit 41 for positioning the rotary seat 4 relative to the stationary seat 3, to a releasing position (see FIG. 9), where the first positioning unit 31 is disengaged from the second positioning unit 41, such that the rotary seat 4 is rotatable relative to the stationary seat 3. In this embodiment, each of the protrusions of the second positioning unit 41 is configured as a ratchet tooth and has an inclined guide surface as shown in FIG. 7.

The stationary seat 3 further has a first limiting unit 32 configured as a limiting block that projects from a periphery of the connecting surface 30 toward the rotary seat 4. In addition, the rotary seat 4 further has a second limiting unit 43 configured as a slot extending circumferentially in the coupling surface 40 and having two closed ends for retaining movably the limiting block of the first limiting unit 32, such that the rotational angle of the rotary seat 4 relative to the stationary seat 3 is limited within an angle range. In this embodiment, the slot of the second limiting unit 43 extends circumferentially past five protrusions of the second positioning unit 41 on the rotary seat 4, so that the rotary seat 4 can be positioned relative to the stationary seat 3 at five selected angular positions.

Referring once again to FIGS. 2 to 4, the control unit 6 of the backrest recline adjustment device 20 is adapted to be mounted on the backrest unit 9 for driving movement of the driving components 5 relative to the rotary seats 4 of the backrest recline adjustment assemblies 2, respectively. The control unit 6 includes a mounting seat 61, an actuator 62, and a limit pin 63.

The mounting seat 61 is adapted to be mounted on the intersection of the intermediate rod portion 925 of the left long connecting rod 921 and the intermediate rod portion 928 of the right long connecting rod 922 of the backrest unit 9, and includes a first operating plate 611 projecting therefrom. The actuator 62 is coupled movably to the mounting seat 61, and has a second operating plate 621 projecting therefrom and parallel to the first operating plate 611 of the mounting seat 61, a limiting groove 622, and parallel guide walls 623 contacting slidably the mounting seat 61 such that the actuator 62 is movable relative to the mounting seat 61 through guidance of the guide walls 623. The limit pin 63 extends through the limiting groove 622 in the actuator 62 and is coupled to the mounting seat 61, thereby limiting the movement of the actuator 62 relative to the mounting seat 61. Each of the backrest recline adjustment assemblies 2 further includes a coupling member 23 interconnecting the actuator 62 and the connecting portion 52 of the respective driving component 5. In this embodiment, the coupling members 23 of the backrest recline adjustment assemblies 2 are formed integrally into a webbing strap having a central portion coupled to the actuator 62.

Before use, for each of the backrest recline adjustment assemblies 2 of the backrest recline adjustment device 20 of this invention, the rotary seat 4 is at the securing position and cannot be rotated relative to the stationary seat 3 due to engagement between the first and second positioning units 31, In use, when a user pushes the second operating plate 621 of the actuator 62 of the control unit 6 toward the first operating plate 611 of the mounting seat 61 of the control unit 6, the actuator 62 is driven to move relative to the mounting seat 61, thereby driving the movement of the driving components 5 of the backrest recline adjustment assemblies 2 through the coupling members 23. For each of the backrest recline adjustment assemblies 2, the movement of the respective driving component 5 drives the rotary seat 4 to move relative to the stationary seat 3 from the securing position to the releasing position against the biasing action of the resilient component 22 (i.e., to move away from the stationary seat 3), so that the first positioning unit 31 is disengaged from the second positioning unit 41, thereby permitting the rotary seat 4 to rotate relative to the stationary seat 3 within the aforesaid limited rotational angle range. Since the rotary seat 4 and the stationary seat 3 are coupled respectively to the backrest unit 9 and the stroller frame 8 of the stroller, tilt of the backrest unit 9 relative to the stroller frame 8 can be adjusted.

When the backrest unit 9 is rotated relative to the stroller frame 8 of the stroller to a desired position, the user releases the second operating plate 621 of the actuator 62 of the control unit 6 For each of the backrest recline adjustment assemblies 2, a restoring force of the resilient component 22 biases the rotary seat 4 to move from the releasing position back to the securing position (i.e., to move toward the stationary seat 3), thereby driving the respective driving component 5 to move back to the normal position. Finally, the first positioning unit 31 re-engages the second positioning unit 41, thereby repositioning the rotary seat 4 relative to the stationary seat 3, i.e., the backrest unit 9 is repositioned relative to the stroller frame 8 at the desired inclination angle.

For each of the backrest recline adjustment assemblies 2, since each of the protrusions of the second positioning unit 41 on the rotary seat 4 is configured as a ratchet tooth with an inclined guide surface, the rotary seat 4 can be rotated in only one direction relative to the stationary seat 3 when at the securing position without requiring operation of the control unit 6. In this embodiment, when the rotary seat 4 is at the securing position, the backrest unit 9 can be moved forwardly relative to the stroller frame 8 from a reclined state to a normal state without requiring operation of the control unit 6, but cannot be moved rearwardly relative to the stroller frame 8 from the normal state to the reclined state.

Compared to the prior art, the user can operate the backrest recline adjustment device 20 of this invention by simply pressing the second operating plate 521 of the actuator 62 of the control unit 6 with one hand, thereby resulting in convenience during use. Moreover, for each of the backrest recline adjustment assemblies 2, the rotary seat 4 can be rotated in one direction relative to the stationary seat 3 when at the securing position without requiring operation of the control unit 6, thereby further enhancing the convenience provided by the backrest recline adjustment device 20 of this invention. Furthermore, by virtue of the engagement between the first positioning unit 31 (i.e., a plurality of the angularly spaced-apart recesses) and the second positioning unit 41 (i.e., a plurality of the angularly spaced-apart protrusions), the rotary seat 4 can be coupled firmly and stably to the stationary sear 3 when at the securing position, such that the seat rods 81 of the stroller frame can be coupled firmly and respectively to the left and right backrest rods 911, 912 of the backrest unit 9.

It should be noted that, the configurations of the first and second positioning units 31, 41 can be interchanged in other embodiments of this invention. For example, the second positioning unit 41 may include a plurality of recesses, while the first positioning unit 31 may include a plurality of protrusions for engaging removably and respectively the recesses of the second positioning unit 41. Moreover, the first limiting unit 32 and the second limiting unit 43 may be interchanged in other embodiments of this invention. That is, the first limiting unit 32 may have a slot extending circumferentially in the connecting surface 30, while the second limiting unit 43 may include a limiting block projecting from a periphery of the coupling surface 40 toward the stationary seat 3.

It should be further noted that, while each of the cam mechanisms 201 of this invention is exemplified with the first cam surface 421 formed on the rotary seat 4 and in the groove 42, and the driving component 5 formed with the second cam surface 51, the configuration of each cam mechanism 201 should not be limited thereto. For example, the driving component 5 of each of the backrest recline adjustment assemblies 2 may be disposed movably between the connecting surface 30 of the stationary seat 3 and the coupling surface 40 of the rotary seat 4, while one of the driving component 5 and the coupling surface 40 of the rotary seat 4 may be provided with the first cam surface 421. As such, movement of the driving component 5 relative to the rotary seat 4 results in sliding movement of the other one of the coupling surface 40 and the driving component 5 on the first cam surfaces 421, thereby driving the rotary seat 4 to move from the securing position to the releasing position (i.e., to move along the pivot pin 24 and away from the stationary seat 3) against the biasing action of the resilient component 22.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A backrest recline adjustment device adapted for connecting rotatably a backrest unit to a stroller frame of a stroller, said backrest recline adjustment device comprising a backrest recline adjustment assembly that includes:

a stationary seat adapted to be connected fixedly to the stroller frame, and having a connecting surface that is provided with a first positioning unit;

a rotary seat adapted to be connected fixedly to the backrest unit, and having a coupling surface that confronts said connecting surface of said stationary seat, that is provided with a second positioning unit corresponding in position to said first positioning unit, and that is formed with a groove, said rotary seat further having a first cam surface that is formed in said groove, said rotary seat being movable relative to said stationary seat between a releasing position, where said rotary seat is rotatable relative to said stationary seat, and a securing position, where said first positioning unit engages said second positioning unit for positioning said rotary seat relative to said stationary seat;

a resilient component disposed for biasing said rotary seat toward said stationary seat; and a driving component disposed slidably in said groove of said rotary seat and provided with a second cam surface that abuts slidably against said first cam surface;

wherein said driving component is movable relative to said rotary seat to drive movement of said second cam surface relative to said first cam surface, thereby moving said rotary seat from the securing position to the releasing position against biasing action of said resilient component.

2. The backrest recline adjustment device as claimed in claim 1, further comprising a control unit adapted to be mounted on the backrest unit for driving movement of said driving component relative to said rotary seat, said backrest recline adjustment assembly further including a coupling member interconnecting said control unit and said driving component.

3. The backrest recline adjustment device as claimed in claim 2, wherein said control unit includes a mounting seat adapted to be mounted on the backrest unit, and an actuator coupled movably to said mounting seat and connected to said coupling member of said backrest recline adjustment assembly.

4. The backrest recline adjustment device as claimed in claim 2, wherein said coupling member of said backrest recline adjustment assembly is a webbing strap.

5. The backrest recline adjustment device as claimed in claim 1, wherein one of said first and second positioning units of said backrest recline adjustment assembly includes a plurality of recesses, and the other one of said first and second positioning units includes a plurality of protrusions for engaging removably and respectively said recesses of said one of said first and second positioning units when said rotary seat of said backrest recline adjustment assembly is at the securing position.

6. The backrest recline adjustment device as claimed in claim 5, wherein each of said protrusions of said one of said first and second positioning units of said backrest recline adjustment assembly is configured as a ratchet tooth, and has an inclined guide surface.

7. The backrest recline adjustment device as claimed in claim 1, wherein:
said stationary seat of said backrest recline adjustment assembly further has a first limiting unit: and
said rotary seat of said backrest recline adjustment assembly further has a second limiting unit engaging said first limiting unit for limiting a rotational angle of said rotary at relative to said stationary seat.

8. The backrest recline adjustment device as claimed in claim 7, wherein:
said first limiting unit of said stationary seat is configured as a limiting block projecting from a periphery of said connecting surface toward said rotary seat of said backrest recline adjustment assembly; and
said second limiting unit of said rotary seat is configured as a slot extending circumferentially in said coupling surface and having two closed ends, said second limiting unit retaining movably said first limiting unit therein.

9. The backrest recline adjustment device as claimed in claim 1, wherein:
said rotary seat of said backrest recline adjustment assembly further has a housing formed at one side thereof opposite to said coupling surface, said housing having a receiving space that is defined cooperatively by an annular surrounding surface and an end surface, and that has an open end opposite to said end surface;

said backrest recline adjustment assembly further includes a seat cover that is connected fixedly to said stationary seat and that is disposed movably at said open end of said housing; and said resilient component of said backrest recline adjustment assembly is disposed in said receiving space, and has opposite ends abutting respectively against said seat cover and said end surface.

10. A stroller comprising:
a stroller frame;
a backrest unit rotatable relative to said stroller frame; and
a backrest recline adjustment device including a pair of spaced-apart backrest recline adjustment assemblies for connecting rotatably said backrest unit to said stroller frame, each of said backrest recline adjustment assemblies including a stationary seat that is connected fixedly to said stroller frame, and that has a connecting surface provided with a first positioning unit, a rotary seat that is connected fixedly to said backrest unit, and that has a coupling surface confronting said connecting surface of said stationary seat, said coupling surface being provided with a second positioning unit that corresponds in position to said first positioning unit of said stationary seat, and being formed with a groove and a first cam surface that is formed in said groove, said rotary seat being movable relative to said stationary seat between a releasing position, where said rotary seat is rotatable relative to said stationary seat, and a securing position, where said first positioning unit engages removably said second positioning unit for positioning said rotary seat relative to said stationary seat, a resilient component that is disposed for biasing said rotary seat toward said stationary seat, and a driving component that is disposed slidably in said groove of said rotary seat and that is provided with a second cam surface abutting slidably against said first cam surface, wherein said driving component is movable relative to said rotary seat to drive movement of said second cam surface relative to said first cam surface, thereby moving said rotary seat from the securing position to the releasing position against biasing action of said resilient component.

11. The stroller as claimed in claim 10, wherein said backrest recline adjustment device further includes a control unit mounted on said backrest unit for driving movement of said driving components of said backrest recline adjustment assemblies, each of said backrest recline adjustment assemblies further including a coupling member interconnecting said driving component thereof and said control unit.

12. The stroller as claimed in claim 11, wherein said control unit of said backrest recline adjustment device includes a mounting seat mounted on said backrest unit, and an actuator coupled movably to said mounting seat and connected to said coupling members of said backrest recline adjustment assemblies.

13. The stroller as claimed in claim 11, wherein said coupling member of each of said backrest recline adjustment assemblies is a webbing strap.

14. The stroller as claimed in claim 10, wherein one of said first and second positioning units includes a plurality of recesses, and the other one of said first and second positioning units includes a plurality of protrusions for engaging removably and respectively said recesses of said one of said first and second positioning units when said rotary seat is at the securing position.

15. The stroller as claimed in claim 10, wherein;
said stationary seat of each of said backrest recline adjustment assemblies further has a first limiting unit; and
said rotary seat of each of said backrest recline adjustment assemblies further has a second limiting unit engaging said first limiting unit of a corresponding one of said backrest recline adjustment assemblies for limiting a rotational angle of said rotary seat relative to said stationary seat.

16. The stroller as claimed in claim 10, wherein;
said rotary seat of each of said backrest recline adjustment assemblies further has a housing formed at one side thereof opposite to said coupling surface, said housing having a receiving space that is defined cooperatively by an annular surrounding surface and an end surface, and that has an open end opposite to said end surface;
each of said backrest recline adjustment assemblies further includes a seat cover that is disposed at said open end of said housing when said rotary seat of a corresponding one of said backrest recline adjustment assemblies is at the securing position, and that is connected fixedly to said stationary seat thereof; and
said resilient component of each of said backrest recline adjustment assemblies is disposed in said receiving space, and has opposite ends abutting resiliently and respectively against said seat cover and said end surface.

17. The stroller as claimed in claim 11, wherein said backrest unit includes:
left and right backrest rods, each of which has one end connected to a respective one of said backrest recline adjustment assemblies;
left and right long connecting rods, said left long connecting rod having a connecting rod end that is connected pivotally to said left backrest rod, a distal rod end that is disposed opposite to said connecting rod end of said left long connecting rod, and an intermediate rod portion that is disposed between said connecting and distal rod ends of said left long connecting rod, said right long connecting rod having connecting rod end that is connected pivotally to said right backrest rod, a distal rod end that is disposed opposite to said connecting rod end of said right long connecting rod, and an intermediate rod portion that is disposed between said connecting and distal rod ends of said right long connecting rod, said control unit of said backrest recline adjustment device being connected to said intermediate rod portions of said left and right long connecting rods; and
left and right short connecting rods, said left short connecting rod having a connecting rod end that is connected pivotally to said left backrest rod, and a distal rod end that is disposed opposite to said connecting rod end of said left short connecting rod and that is connected pivotally to said distal rod end of said right long connecting rod, said right short connecting rod having a connecting rod end that is connected pivotally to said right backrest rod, and a distal rod end that is disposed opposite to said connecting rod end of said right short connecting rod and that is connected pivotally to said distal rod and of said left long connecting rod.

18. A stroller comprising:
a stroller frame;
a backrest unit rotatable relative to said stroller frame; and
a backrest recline adjustment device including a pair of spaced-apart backrest recline adjustment assemblies for connecting rotatably said backrest unit to said stroller frame, each of said backrest recline adjustment assemblies including
a stationary seat that is connected fixedly to said stroller frame,
a rotary seat that is connected fixedly to said backrest unit, that is connected separably to said stationary seat, and that has a cam surface,
a positioning mechanism that is provided on said stationary seat and said rotary seat for positioning said rotary seat relative to said stationary seat,
a resilient component that is disposed for biasing said rotary seat toward said stationary seat, and
a driving component that is disposed movably between said cam surface of said rotary seat and said stationary seat, and that contacts slidably said cam surface of said rotary seat,
wherein movement of said driving component in a first direction relative to said rotary seat results in movement of said driving component on said cam surface, thereby driving said rotary seat to move away from the stationary seat in a second direction that is transverse to the first direction, so that said rotary seat is rotatable relative to said stationary seat.

19. The stroller as claimed in claim 18, wherein said positioning mechanism of each of said backrest recline adjustment assemblies includes:
a plurality of recesses that are formed in one of said stationary seat and said rotary seat; and
a plurality of protrusions that are formed in the other one of said stationary seat and said rotary seat, and that are disposed for engaging removably and respectively said recesses when said rotary seat is positioned relative to said stationary seat.

20. The stroller as claimed in claim 18, wherein said backrest recline adjustment device further includes a control unit mounted on said backrest unit for driving movement of said driving components of said backrest recline adjustment assemblies, each of said backrest recline adjustment assemblies further including a coupling member interconnecting said driving component thereof and said control unit.

21. The stroller as claimed in claim 20, wherein said backrest unit includes:
a pair of backrest rods, each of which has one end connected to a respective one of said backrest recline adjustment assemblies;
a pair of long connecting rods connected pivotally and respectively to said backrest rods and intersect each other, each of said long connecting rods having a connecting rod end that is connected pivotally to the respective one of said backrest rods, and a distal rod end that is disposed opposite to said connecting rod end, said control unit being mounted to the intersection of said long connecting rods; and
a pair of short connecting rods connected pivotally and respectively to said backrest rods, each of said short connecting rods having a connecting rod end that is connected pivotally to the respective one of said backrest rods, and a distal rod end that is disposed opposite to said connecting rod end and that is connected pivotally to said distal rod end of a corresponding one of said long connecting rods.

* * * * *